Dec. 8, 1925.  1,564,776
W. R. GREEN
COMBINED LUGGAGE AND TIRE CARRIER
Filed Nov. 1, 1923   2 Sheets-Sheet 1
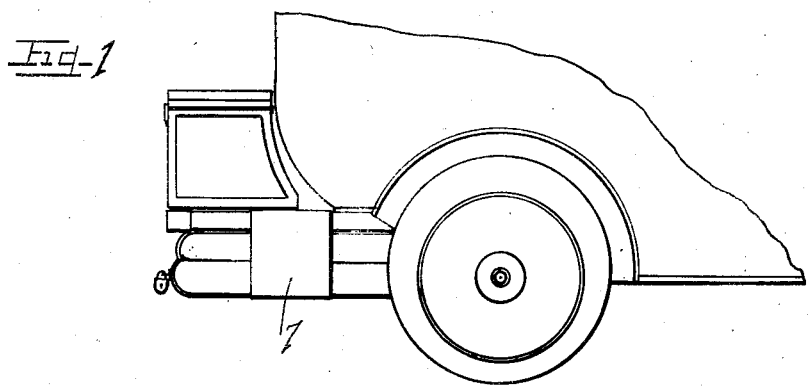
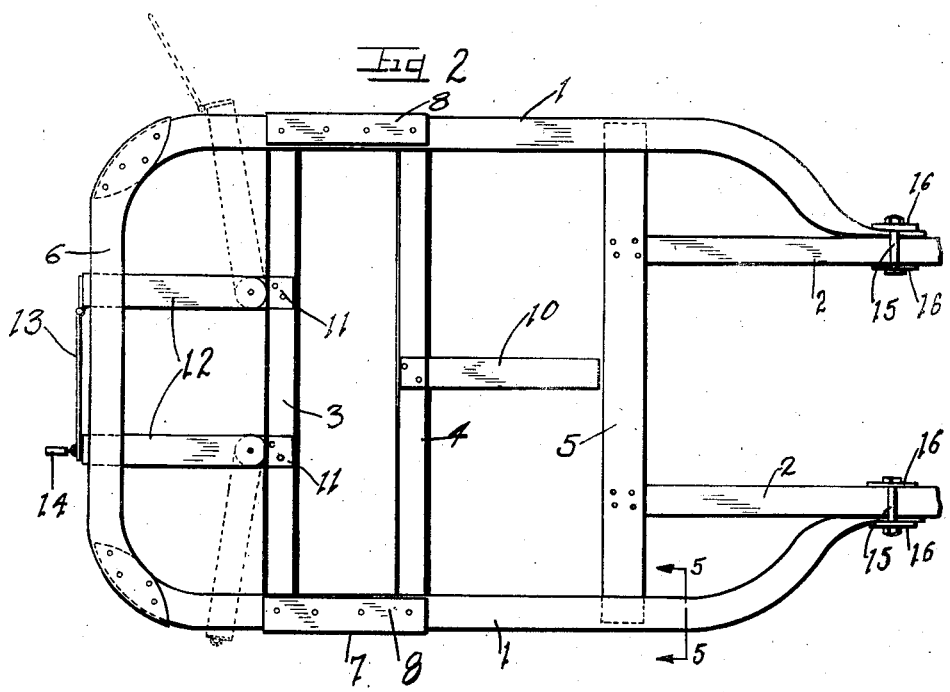
Witnesses
Inventor
Walter R. Green
by
Attys.

Dec. 8, 1925.                                                      1,564,776
                          W. R. GREEN
              COMBINED LUGGAGE AND TIRE CARRIER
                    Filed Nov. 1, 1923          2 Sheets-Sheet 2
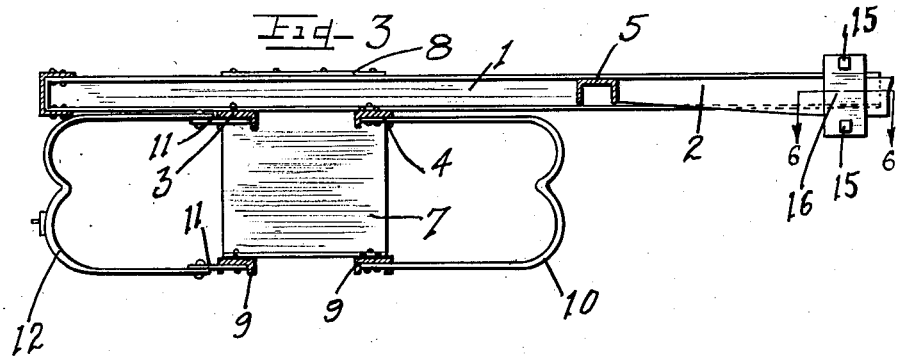
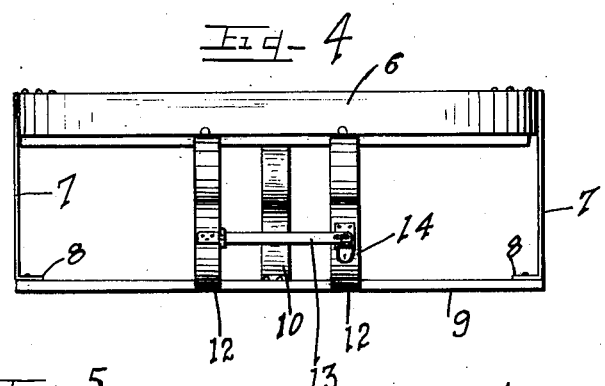
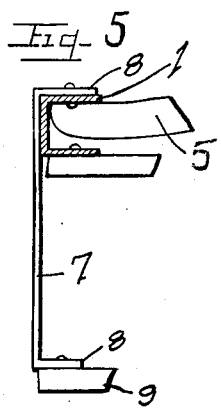
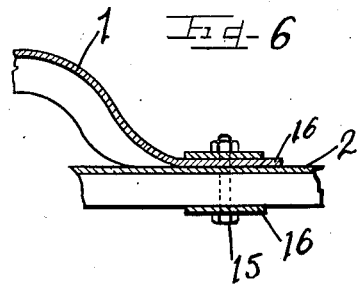
Witnesses                                        Inventor
                                              Walter R. Green
                            by Patented Dec. 8, 1925.

1,564,776

UNITED STATES PATENT OFFICE.

WALTER R. GREEN, OF CHICAGO, ILLINOIS.

COMBINED LUGGAGE AND TIRE CARRIER.

Application filed November 1, 1923. Serial No. 672,054.

*To all whom it may concern:*

Be it known that I, WALTER R. GREEN, a citizen of the United States, and a resident of the city of Chicago, in the county of Cook and State of Illinois, have invented certain new and useful Improvements in a Combined Luggage and Tire Carrier; and I do hereby declare that the following is a full, clear, and exact description of the same, reference being had to the accompanying drawings, and to the numerals of reference marked thereon, which form a part of this specification.

This invention relates to a combined luggage and tire carrier adapted for attachment to the rear part of the chassis of a vehicle.

It is an object of this invention to provide a supporting platform having a two point attachment to the chassis and that extends beyond the rear thereof for supporting luggage such as a trunk or the like with provision therebeneath for supporting spare tires.

The invention comprises the novel mechanism and combinations of parts hereinafter described and more particularly pointed out and defined in the appended claims.

In the accompanying drawings, which illustrate a preferred embodiment of this invention, and in which similar reference numerals refer to similar features in the different views:

Figure 1 is a fragmentary side elevational view of an automobile with my combined tire and luggage carrier attached thereto.

Figure 2 is an enlarged top plan view of the combined tire and luggage carrier.

Figure 3 is a longitudinal section through the carrier showing parts of the automobile chassis and parts of the carrier in elevation.

Figure 4 is a rear elevational view of the carrier.

Figure 5 is an enlarged sectional view upon the line 5—5 of Figure 2.

Figure 6 is an enlarged sectional view upon the line 6—6 of Figure 3.

In referring now to the drawings, which illustrate one embodiment of this invention, it will be observed that the combined tire and luggage carrier comprises a platform or supporting structure which consists of side rails 1 in the form of channel bars. The forward ends of these side rails converge or are bent inwardly so as to embrace the longitudinal beams 2 of the chassis of the automobile or vehicle to which the same may be attached at some suitable intermediate point and at a suitable distance from the rear thereof to provide proper leverage. These side rails are connected in rigid spaced relation by the transverse members 3, 4 and 5 which are secured to the lower flange of the side rails. The forward transverse member 5 is spaced a suitable distance from the forward ends of the side rails and is adapted for attachment to the ends of the beams 2. The rear ends of the side rails are curved inwardly, and a rear channel section 6, having suitably formed and curved ends, is secured thereto.

A horizontally extending tire carrier is supported upon the bottom of the luggage platform and to this end a pair of brackets 7 depend from opposite sides of the platform. These brackets are provided with upper and lower right angled flanges 8, the former of which rest upon the top of rails 1 and the latter of which form supports for transversely extending channel bars 9 which are secured thereto. The brackets 7 are so positioned with reference to the transverse members 3 and 4 that one transverse channel bar 9 is supported directly below the member 3 and the other directly below the member 4. A U-shaped metal strip 10 is attached to the transverse channel member 4 and the channel bar 9 therebelow. The ends of this U-shaped member extend through slots in the flanges of said channel bars and may be secured to the ends thereof in any suitable way. The bottom of this U-shaped member is directed horizontally toward the front of the vehicle and is provided with a medial indented portion to provide a pair of tire receiving recesses.

Upon the bottom flanges of the channel member 3 and the channel member 9 therebelow are rearwardly projecting plates or brackets 11, a pair being secured upon each channel bar in spaced relation. A pair of U-shaped tire retainers 12 have their ends pivoted to the brackets 11 and are capable of being swung from full line positions to dotted line positions as shown in Figure 2. These tire retainers 12 are similar in contour to the retainer 10. A latch bar 13 is pivoted to one of the tire retainers 12 and is adapted to be locked to the other retainer 12 by means of a padlock 14 or the like.

The transverse members 3 and 4 and retainer 10 are adapted to hold the tires in horizontal balanced position so that the retainers 12 may be swung laterally for the removal of a tire from the carrier formed by these parts or the insertion of one therein. Thereafter the carrier may be locked by swinging the retainers 12 to full line positions and connecting the same together by the latch bar 13 and applying the padlock 14 as is obvious. By mounting the tire carrier in a horizontal position so that the tires are sustained in a horizontal position the same will be sufficiently high above the ground so as not to interfere with any projecting object in the road.

The combined tire and luggage carrier may be readily secured to the chassis of a vehicle by positioning the transverse member 5 over the ends of the beams 2 and bolting the same thereto, and then clamping the side rails 1 to the beams 2 by means of bolts 15 and plates 16 which engage the inner side of the beams 2 and the outer lateral face of the rails 1 as shown in Figure 6. It will be noted that the luggage platform is attached at the transverse member 5 and at the forward ends of the side rails 1, the two points of attachment being sufficiently spaced apart to provide a proper supporting leverage therebetween to rigidly hold the luggage platform against sagging.

I am aware that numerous details of construction may be varied through a wide range without departing from the principles of this invention, and I therefore do not purpose limiting the patent granted otherwise than necessitated by the prior art.

I claim as my invention:

1. In a vehicle having a chassis comprising side rails, a platform having rigid side members connected to said rails and a transverse bar also connected to said rails, a pair of brackets depending from said side members, a pair of spaced transverse members connected to said brackets, a pair of spaced transverse members connected to said side members, two sets of oppositely directed tire retaining brackets secured to said transverse members, one set of tire retaining brackets being swingable for the insertion and removing of ties.

2. A combined luggage and tire carrier comprising rigid side members and a transverse attaching member, said side members having inwardly bent ends adapted for attachment to the chassis of a vehicle, a bracket depending from each side member, spaced bars connecting said brackets, similarly spaced bars connected to said side members in parallel relation with the first mentioned bars, and two sets of opposed tire retaining members secured to said bars, one set being movable for the removal or insertion of tires.

3. A combined luggage and tire carrier comprising a pair of side members, a pair of spaced bars connecting said members, a bracket depending from each side member, a pair of spaced bars connected to the lower ends of said bracket members, a U-shaped tire retaining member connected to the forward bars, a pair of U-shaped tire retaining members pivotally connected to the rear bars and swingable in opposite directions for the removal of a tire.

In testimony whereof I have hereunto subscribed my name.

WALTER R. GREEN.